United States Patent [19]

Urushihara et al.

[11] Patent Number: 5,072,583
[45] Date of Patent: Dec. 17, 1991

[54] EXHAUST SYSTEM FOR INTERNAL COMBUSTION ENGINES

[75] Inventors: Tomonori Urushihara; Junichi Yokoyama, both of Kanagawa; Teruyuki Itoh, Tokyo, all of Japan

[73] Assignee: Nissan Motor Company, Ltd., Japan

[21] Appl. No.: 476,792

[22] Filed: Feb. 8, 1990

[30] Foreign Application Priority Data

Feb. 8, 1989 [JP] Japan .................................. 1-27601

[51] Int. Cl.⁵ .............................................. F02B 27/02
[52] U.S. Cl. ....................................................... 60/313
[58] Field of Search ...................................... 60/313, 312

[56] References Cited

U.S. PATENT DOCUMENTS 4,953,352  9/1990  Campbell ............................. 60/313

Primary Examiner—Douglas Hart
Attorney, Agent, or Firm—Leydig, Voit & Mayer

[57] ABSTRACT

An exhaust system for internal combustion engines includes at least two exhaust passages, each passage communicated with at least one branch exhaust passage of an exhaust manifold communicating exhaust ports of a multiple-cylinder engine, and a confluent exhaust passage disposed downstream of said at least two exhaust passages, said confluent exhaust passage including a confluent point for converging downstream ends of said at least two exhaust passages. The exhaust system also includes a communication passage substantially parallel with the at least two exhaust passages and a valve disposed in the communication passage, for allowing a portion of exhaust gas flow to bypass said confluent point only when the engine is within a predetermined high engine revolution range.

8 Claims, 8 Drawing Sheets

FIG. 4 *(PRIOR ART)*
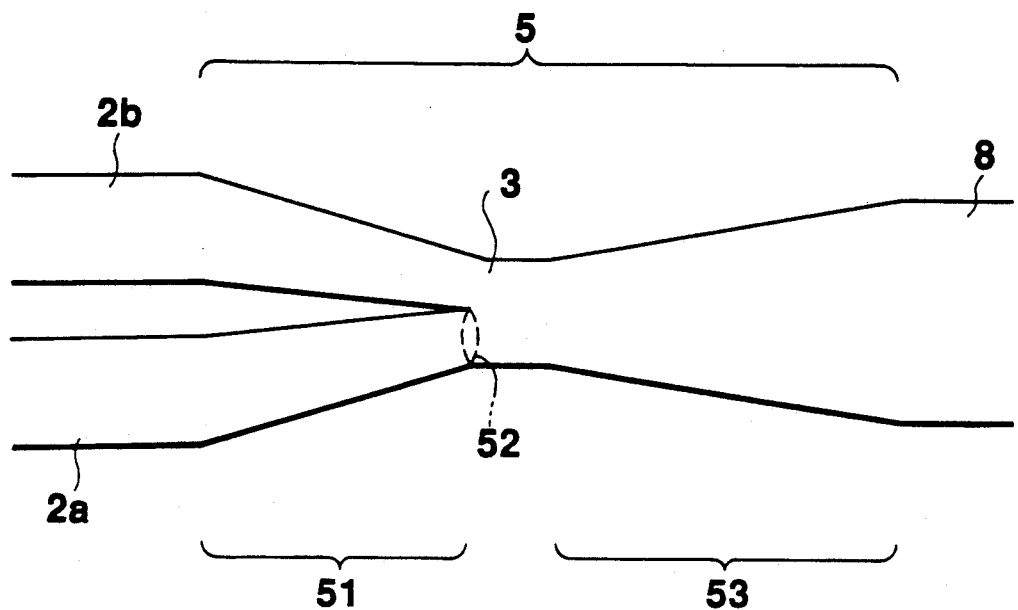
FIG. 5 *(PRIOR ART)*
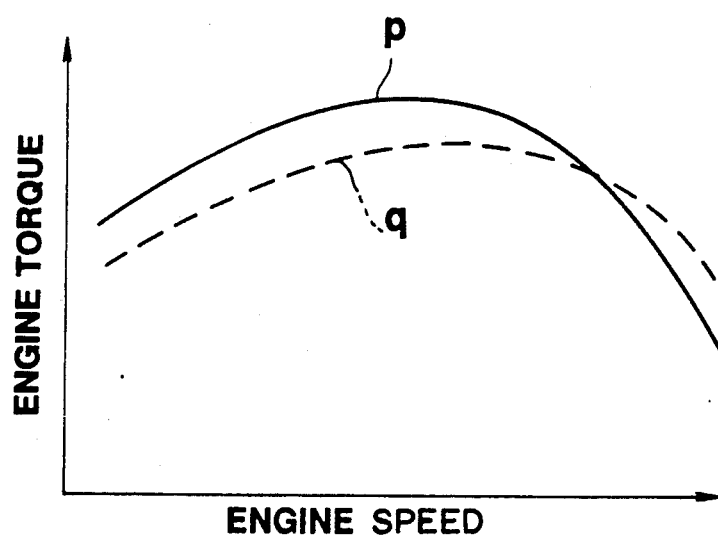

EXHAUST SYSTEM FOR INTERNAL COMBUSTION ENGINES

BACKGROUND OF THE INVENTION

1. Field of the Invention

The present invention relates to an exhaust system for an internal combustion engine having multiple-cylinders. Specifically to a system which includes a confluent exhaust passage converging at least two exhaust passages upstream thereof, each upstream exhaust passage being communicated separately with associated plural branched exhaust passages of an exhaust manifold communicating the exhaust ports of a multiple-cylinder engine.

2. Description of the Prior Disclosure

Recently, there have been proposed and developed various exhaust systems including at least two intermediate exhaust passages, each communicated separately with the associated plural branch exhaust passages of an exhaust manifold. In general, the intermediate exhaust passages are formed of a dual exhaust tube.

One such conventional exhaust system is shown in FIG. 1. Referring now to FIG. 1, a four-cylinder in line engine includes a cylinder head 1 having exhaust ports through which first, second, third and fourth cylinders #1, #2, #3 and #4, respectively communicate branch exhaust passages a, c, d and b of an exhaust manifold. The exhaust system includes a dual exhaust tube section 2 defining first and second exhaust passages $2_a$ and $2_b$. The first exhaust passage $2_a$ communicates both downstream ends of the passages a and b, while the second exhaust passage $2_b$ communicates both downstream ends of the passages c and d. The two exhaust passages $2_a$ and $2_b$ are communicated with a single confluent exhaust passage 8 through a nodal point or confluent point 3. As is generally known, a catalytic converter or a muffler assembly 4 is employed on an exhaust tube defining the exhaust passage 8 to absorb and damp out exhaust noises or to convert gaseous pollutants into harmless gases.

Another conventional exhaust system including an intermediate dual exhaust tube connected to a plurality of branch exhaust pipes of an exhaust manifold has been disclosed in Japanese Utility Model First Publication (Jikkai) Showa 63-79439. The prior art exhaust system further includes a pulse converter 5 downstream of the intermediate dual exhaust tube 2 as shown in FIGS. 2 and 3. The exhaust system shown in FIG. 2 is different from that of FIG. 3 in that the exhaust system is applied to internal combustion engines with a turbocharger 9 (a supercharger driven by the engine exhaust gas).

As clearly seen in FIGS. 2 and 3, an ejector 51 is provided upstream of and adjacent to the confluent point 3 such that its cross section is gradually choked towards its downstream direction. A diffuser 53 is also provided downstream of and adjacent to the confluent point 3 such that its cross section is gradually expanded towards its downstream direction. As is well known, the ejector 51 acts for converting fluid having high pressure and low speed to fluid having low pressure and high speed, while the diffuser 53 acts for converting fluid having low pressure and high speed to fluid having high pressure and low speed. The aforementioned pulse converter 5 is composed of the ejector 51 and the diffuser 53 as best seen in FIG. 4. Traditionally, the pulse converter 5 is utilized to improve engine torque within a low or medium engine speed range.

Such conventional exhaust systems have various problems. These problems will be described in detail by comparing two engine performance curves shown in FIG. 5, one (as shown in the phantom line q of FIG. 5) being a performance curve of a four-cycle in line engine utilizing the exhaust system without the pulse converter as shown in FIG. 1, the other (as shown in the continuous line p of FIG. 5) being a performance curve of a four-cycle in line engine utilizing the exhaust system with the pulse converter as shown in FIG. 3.

As appreciated from the graph of FIG. 5, it will be found that, within a medium or low engine speed range, the engine torque of the exhaust system having the pulse converter exceeds that of the exhaust system not having the pulse converter because exhaust gases flowing through the two passages $2_a$ and $2_b$ are converted in such a manner as to have higher speed and lower pressure by the ejector 51 and thus exhaust gas flowing through one of the passages $2_a$ and $2_b$ does not disturb gas flow through the other but facilitates its exhaust gas flow. In this manner, when the engine is running at a low or medium speed, the ejector 51 acts to prevent exhaust gas flows through both passages $2_a$ and $2_b$ from interfering with each other and additionally to enhance charging efficiency of the air-fuel mixture and scavenging efficiency of exhaust gas in such a manner that the exhaust gas flowing through one of the passages $2_a$ and $2_b$ is effectively exhausted with the aid of gas flow through the other passage in jet fashion, during blowdown. Such effect of the ejector will be hereinafter referred to as an "ejector effect".

On the other hand, in the exhaust system of FIG. 4 having the pulse converter, when the engine is running at a high speed, exhaust gas flow through the ejector 51 is choked in the vicinity of the outlet 52 of the ejector 51 due to excessively great exhaust gas flow. This results in increase in exhaust pressure upstream of the outlet 52. Consequently, back pressure rises and therefore exhaust loss is increased, thereby lowering the charging efficiency of the mixture. For this reason, as seen in the graph of FIG. 5, the engine torque of an exhaust system not including a pulse converter exceeds that of a system including a pulse converter, at high engine speeds.

In other words, the conventional exhaust systems including a pulse converter are so designed that engine torque at low or middle engine speeds is enhanced at the sacrifice of engine torque at high engine speeds.

Although the exhaust systems not including a pulse converter have the advantage of generating higher engine torque during engine high speeds when compared with the exhaust systems including a pulse converter, there is a tendency for choked flow to occur at the confluent point of the two passages $2_a$ and $2_b$ during excessively high engine speeds, thereby resulting in lowering of engine torque.

SUMMARY OF THE INVENTION

It is, therefore in view of the above disadvantages, an object of the present invention to provide an exhaust system for internal combustion engines which provides higher engine torque within a wide engine speed range from low revolutions to high speeds.

It is another object of the invention to provide an exhaust system for internal combustion engines having at least two intermediate exhaust passages, such as two exhaust passages defined by for example an intermediate dual exhaust tube section, each intermediate exhaust passage communicated separately with the associated plural branch exhaust passages of an exhaust manifold of the engine, which can lower exhaust loss due to choked exhaust gas flow occurring at a nodal point or confluent point to which the downstream ends of the intermediate passages are converged, at high engine speeds.

In order to accomplish the aforementioned and other objects, an exhaust system for internal combustion engines comprises at lest two exhaust passages, each passage communicated with at least one branch exhaust passage of an exhaust manifold communicating exhaust ports of a multiple-cylinder engine, and a confluent exhaust passage disposed downstream of the at least two exhaust passages. The confluent exhaust passage includes a confluent point for converging downstream ends of the at least two exhaust passages. The exhaust system also includes means for bypassing the confluent point with a portion of exhaust gas flow only when the engine is within a predetermined high engine speed range. The bypassing means includes a communication passage for bypassing the confluent point and intercommunicating the at least two exhaust passages and the confluent exhaust passage, a valve for establishing and blocking the bypassed exhaust gas flow through the communication passage, and valve control means for opening the valve only when the engine is within the predetermined high engine speed range. The valve control means includes sensor means for monitoring an operating state of the engine, a control unit for determining the operating state of the engine on the basis of at least one signal from the sensor means, and an actuator for actuating the valve in response to a control signal from the control unit.

According to another aspect of the invention, an exhaust system for internal combustion engines comprises a dual exhaust tube section defining two exhaust passages, each passage communicated with at least two branch exhaust passages of an exhaust manifold communicating exhaust ports of a multiple-cylinder engine, and a confluent exhaust passage disposed downstream of the two exhaust passages. The confluent exhaust passage includes a confluent point for converging downstream ends of the two exhaust passages. The exhaust system also includes a communication passage intercommunicating the two exhaust passages and the confluent exhaust passage so as to bypass the confluent point with a portion of exhaust gas flow, a valve disposed in the communication passage, for establishing and blocking the bypassed exhaust gas flow through the communication passage, sensor means for monitoring an operating state of the engine, and valve control means for opening the valve only when the valve controlling means determines on the basis of at least one signal from the sensor means that the engine is within a predetermined high engine speed range. The sensor means includes a sensor generating a signal representative of a throttle opening angle and/or a sensor generating a signal representative of engine speed.

According to a further aspect of the invention, an exhaust system for internal combustion engines comprises at least two exhaust passages, each passage communicated with at least one branch exhaust passage of an exhaust manifold communicating exhaust ports of a multiple-cylinder engine, and a confluent exhaust passage disposed downstream of the at least two exhaust passages. The confluent exhaust passage includes a confluent point for converging downstream ends of the at least two exhaust passages. The exhaust system also includes a pulse converter disposed in the vicinity of the confluent point for changing flow velocity and pressure of exhaust gas. The pulse converter is comprised of an ejector disposed adjacent to and upstream of the confluent point and a diffuser disposed adjacent to and downstream of the confluent point. The exhaust system also includes means for varying exhaust gas flow through the pulse converter such that the exhaust gas flow is decreased only when the engine is within a predetermined high speed range. The varying means comprises a communication passage substantially parallel with the at least two exhaust passages for intercommunicating the two exhaust passages and the confluent exhaust passage downstream of the pulse converter so as to cause a portion of the exhaust gas flowing through the pulse converter to bypass the pulse converter, a valve disposed in the communication passage, for establishing and blocking the bypassed exhaust gas flow through the communication passage, sensor means for monitoring an operating state of the engine, and valve control means for opening the valve only when the valve control means determines on the basis of at least one signal from the sensor means that the engine is within the predetermined high engine speed range.

BRIEF DESCRIPTION OF THE DRAWINGS

FIG. 4 is an enlarged view illustrating the pulse converter shown in FIG. 3.

FIG. 5 is a graph illustrating engine torque characteristics of the respective conventional exhaust systems of FIGS. 1 and 3.

DESCRIPTION OF THE PREFERRED EMBODIMENTS

Figure 1:
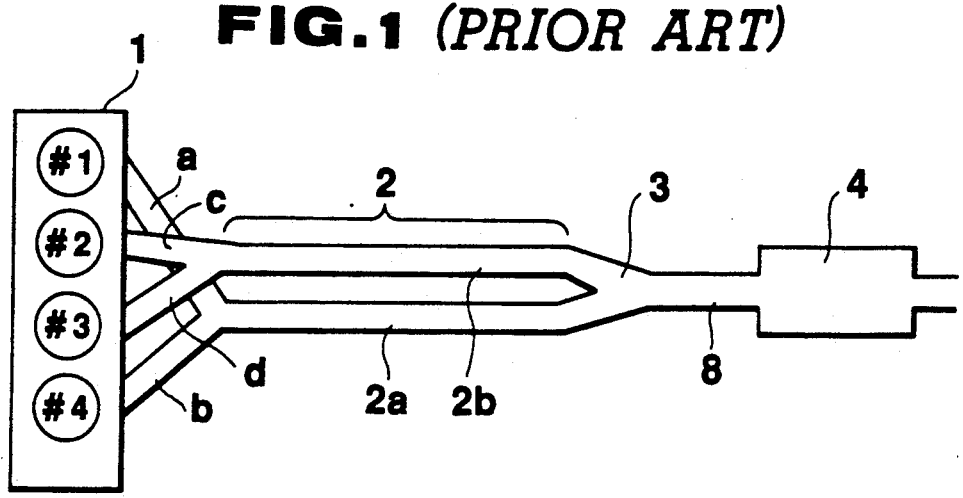
FIG. 1 is a plan view illustrating a conventional exhaust system including an intermediate dual exhaust tube section connected to an exhaust manifold of a four-cylinder in line engine.
Figure 2:
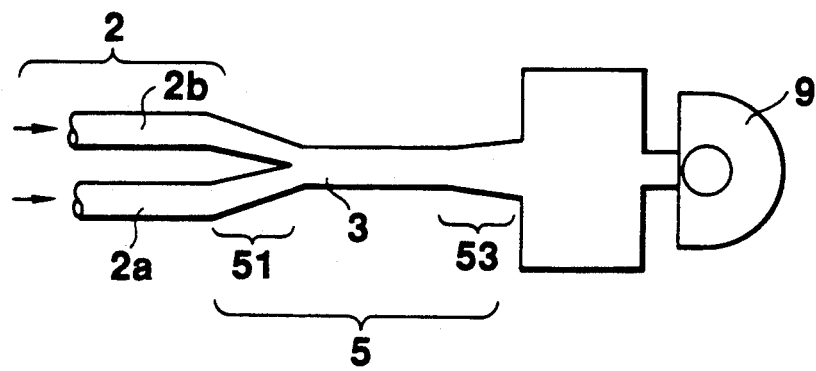
FIG. 2 is a plan view illustrating a conventional exhaust system including an intermediate dual exhaust tube section connected to an exhaust manifold of a four-cylinder in line engine with a turbocharger and also including a pulse converter downstream of the dual tube section.

The principles of the present invention, applied to an exhaust system for internal combustion engines, are illustrated in FIGS. 6A to 14B.

For the purpose of simplification of description, the same reference numerals used in the prior art exhaust systems of FIGS. 1 to 4 will be applied to corresponding elements used in the embodiments of FIGS. 6A to 14B.

Figure 6A:
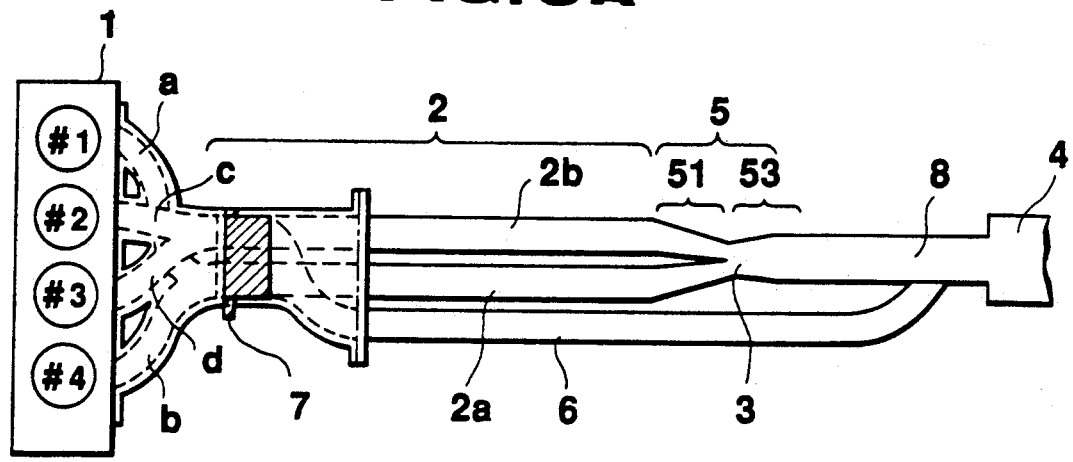
FIG. 6A is a plan view illustrating one embodiment of an exhaust system for internal combustion engines according to the invention.

Referring now to FIGS. 6A to 8, particularly to FIG. 6A, an exhaust system according to the invention is applied to a four-cylinder in line engine including a cylinder head 1 having exhaust ports through which first, second, third and fourth cylinders #1, #2, #3 and #4, respectively communicate with branch exhaust passages a, c, d and b of an exhaust manifold of the engine. The exhaust system includes a dual exhaust tube section 2 defining first and second exhaust passages $2_a$ and $2_b$. The first exhaust passage $2_a$ communicates both downstream ends of the passages a and b, while the second exhaust passage $2_b$ communicates both downstream ends of the passages c and d. The two exhaust passages $2_a$ and $2_b$ are communicated with a single confluent exhaust passage 8 through a confluent point 3. A catalytic converter or muffler assembly 4 is also employed on an exhaust tube defining the exhaust passage 8 to absorb and damp out noises or to convert gaseous pollutants into harmless gases. The exhaust system also includes a pulse converter 5 comprised of an ejector 51 provided upstream of and adjacent to the confluent point 3 and a diffuser 53 provided downstream of and adjacent to the confluent point 3.

Figure 3:
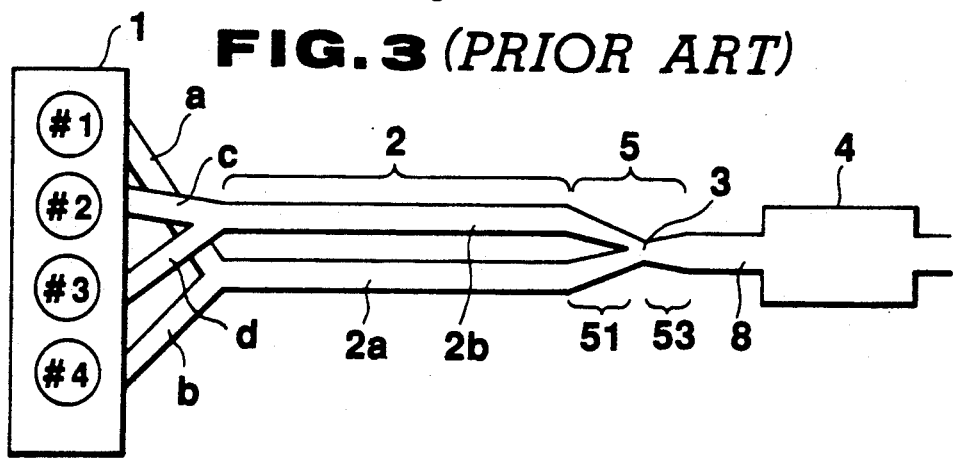
FIG. 3 is a plan view illustrating a conventional exhaust system including an intermediate dual tube section connected to an exhaust manifold of a four-cylinder in line engine without a turbocharger and also including a pulse converter downstream of the dual tube section.

The aforementioned construction of the exhaust system is similar to the conventional exhaust system as shown in FIG. 3.

Figure 6B:
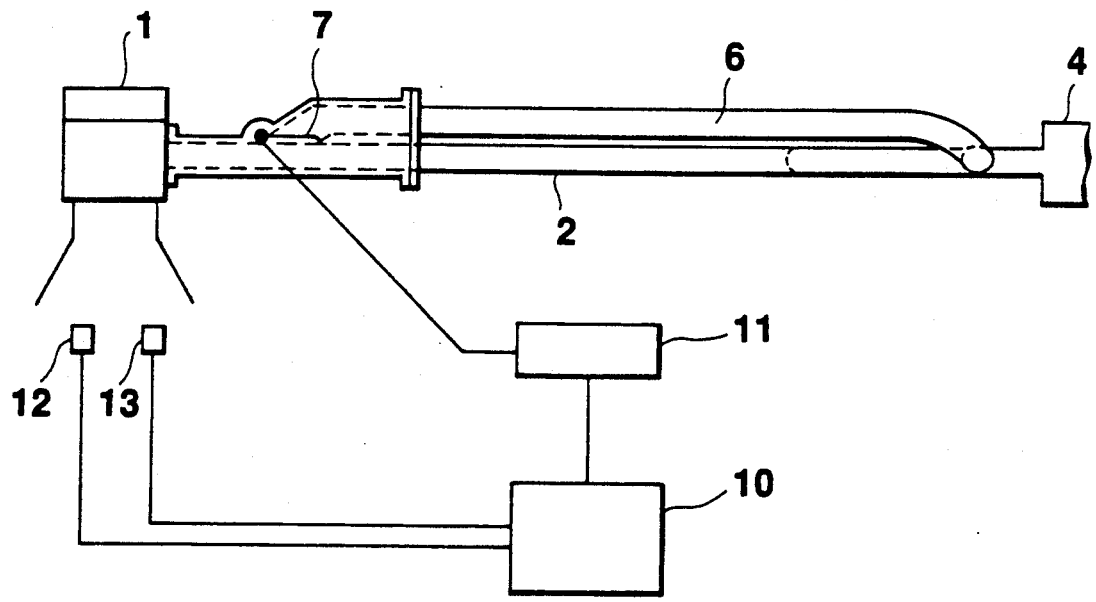
FIG. 6B is a front view in elevation of the embodiment of FIG. 6A.

The exhaust system of the invention includes an additional communication passage 6, one end of the passage 6 communicating both of the exhaust passages $2_a$ and $2_b$ and the other end communicating the confluent passage 8 downstream of the confluent point 3. That is, the communication passage parallels the exhaust passages $2_a$ and $2_b$ in such a manner as to bypass the confluent point 3. The exhaust system of the invention also includes a valve 7 provided in the communication passage 6 for establishing and blocking exhaust gas flow through the communication passage 6. The valve 7 is actuated by an actuator 11 as shown in FIG. 6B. The actuator 11 is controlled by a control unit 10 provided for determining the operating state of the engine on the basis of signals from various sensors, for example a sensor 12 generating a signal representative of a throttle opening angle and/or a sensor 13 generating a signal representative of engine speed.

The exhaust system according to the invention will operate as follows.

When the control unit 10 determines on the basis of signals from sensors 12 and 13 that the engine is running within a low or medium speed range, the control unit controls the actuator 11 in such a manner as to fully close the valve 7 with the result that exhaust gas flow through the communication passage 6 is blocked. Conversely, when the control unit 10 determines that the engine is running within a high speed range, the control unit controls the actuator 11 in such a manner as to fully open the valve 7 with the result that the exhaust gas flow through the communication passage 6 is established.

Figure 7A:
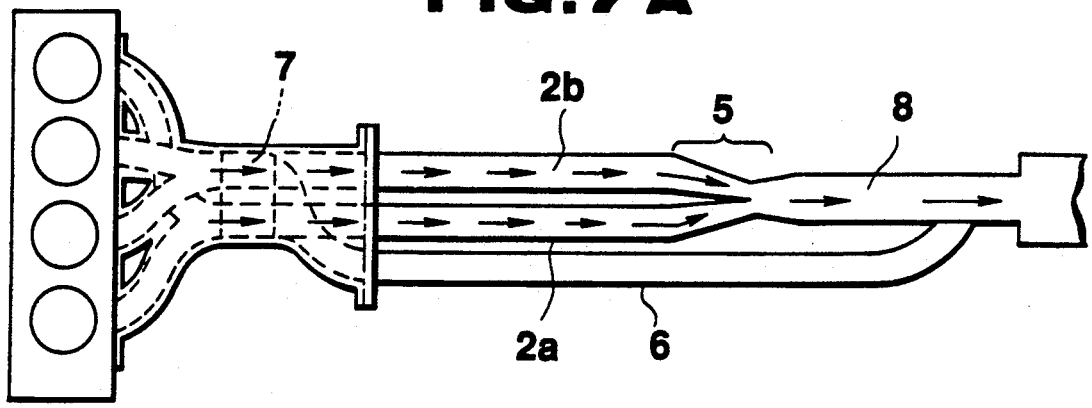
FIGS. 7A and 7B are plan view illustrating two different flow patterns of exhaust gas flowing through the exhaust system of the embodiment shown in FIGS. 6A and 6B, taken along the arrows.

In the above mentioned valve closed state, since the communication passage 6 is blocked as shown in FIG. 7A, the exhaust gas is exhausted from the exhaust manifold through the two exhaust passages $2_a$ and $2_b$ and the pulse converter 5 to the confluent exhaust passage 8 in that order, according to the same exhaust path as the previously mentioned conventional exhaust system shown in FIG. 3.

Figure 7B:
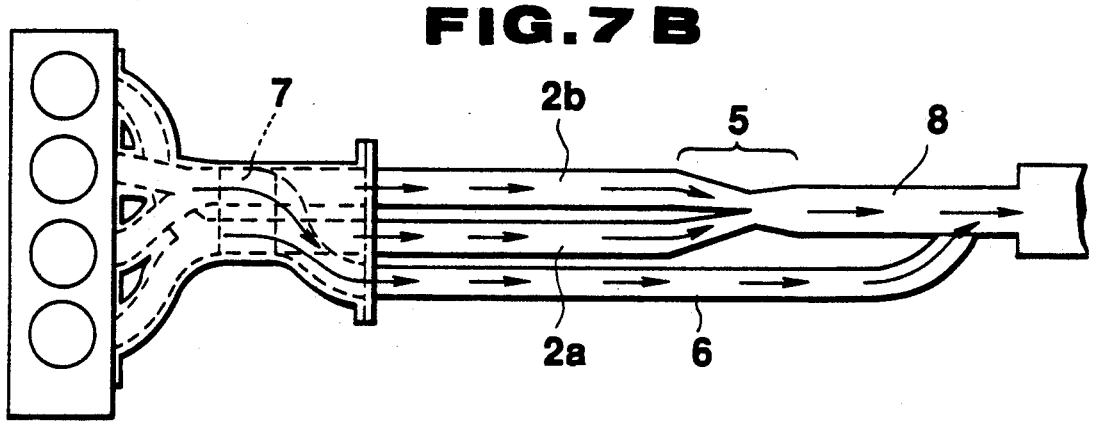

On the other hand, in the valve open state, since the communication passage 6 is established as shown in FIG. 7B, the exhaust gas is exhausted through both exhaust paths, namely a first path from the exhaust manifold through the two exhaust passages $2_a$ and $2_b$ and the pulse converter 5 to the confluent exhaust passage 8, and a second path from the exhaust manifold through the communication passage 6 to the confluent exhaust passage 8.

At high engine speeds, the exhaust system of the invention operates such that the exhaust gas is exhausted through both the previously described paths. As a result, the exhaust system of the invention can prevent choked flow occuring at the outlet of the ejector 51, within a high engine speed range. Therefore, the exhaust system of the invention can avoid back pressure-rise and consequently prevent the lowering of engine torque within the high engine speed range.

Figure 8:
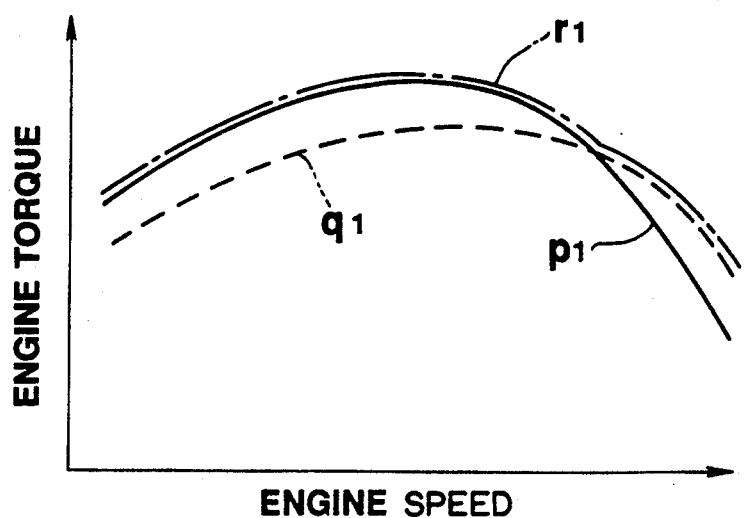
FIG. 8 is a graph illustrating engine torque characteristics of the embodiment shown in FIGS. 6A and 6B.

The exhaust system of one embodiment shown in FIGS. 6A and 6B has engine torque characteristics as shown in the graph of FIG. 8. In the graph, the continuous line $p_1$ corresponds to the engine torque characteristic curve in a fully closed state of the valve 7, while the broken line $q_1$ corresponds to the engine torque characteristic curve in a fully open state of the valve 7. The exhaust system of the invention exhibits engine torque characteristics shown by the dashed line $r_1$ according to the switching operation of the valve 7. That is, when the engine is running within a low or medium speed range, the engine torque curve changes along the continuous line $p_1$. While the engine is running within a high engine speed range, the engine torque curve changes along the broken line $q_1$. As appreciated from the graph of FIG. 8, the engine employing the exhaust system of this embodiment allows higher engine torque at all engine running speeds.

Figure 9A:
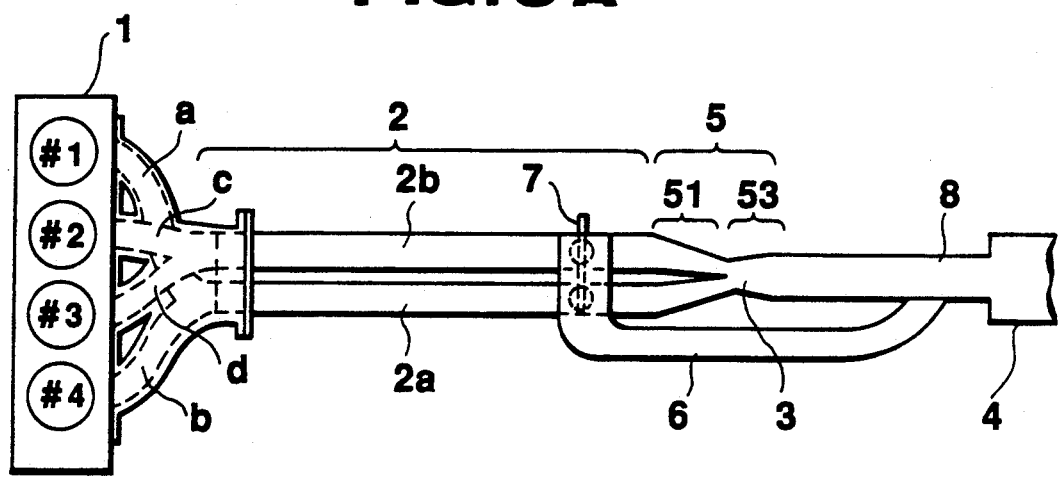
FIGS. 9A and 9B are a plan view and a front view in elevation illustrating a modification of the embodiment shown in FIGS. 6A and 6B.
Figure 9B:
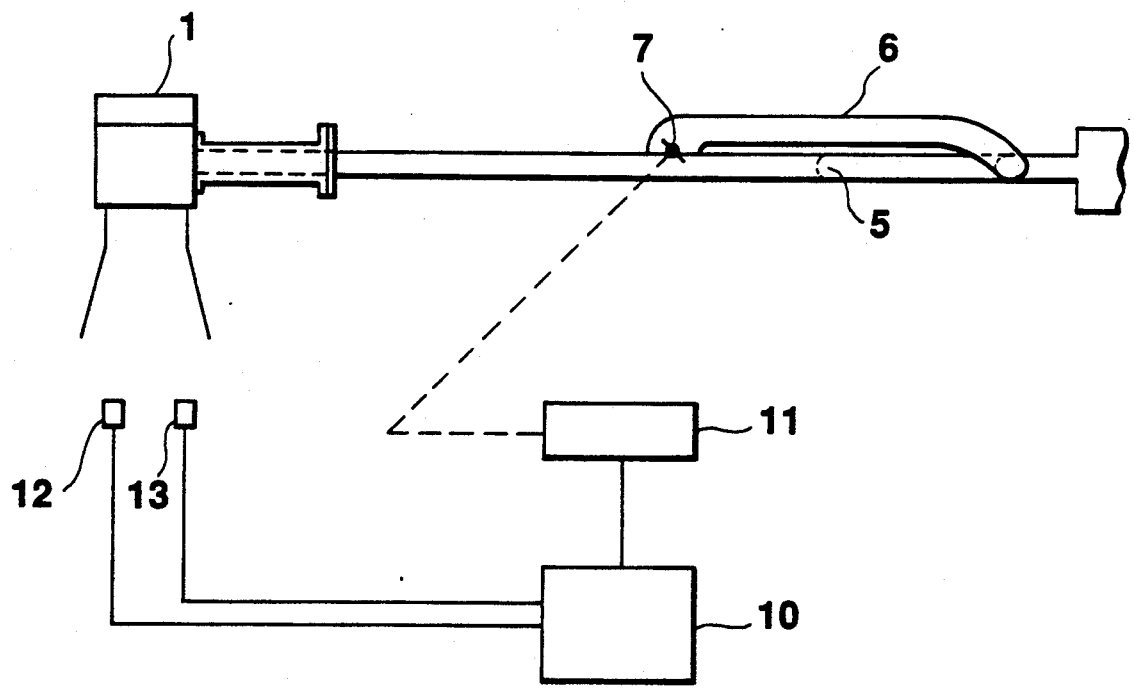

FIGS. 9A and 9B are a modification of the embodiment shown in FIGS. 6A and 6B. The modification is different from the exhaust system of FIGS. 6A and 6B with regard to an installation position of a connection portion between the upstream end of the communication passage 6 and both exhaust passages $2_a$ and $2_b$. As clearly seen by comparing FIGS. 6A and 9A, the connection portion of FIG. 9A is provided more downstream than that of FIG. 6A. For the purpose of clarification of the difference between the systems of FIGS.

Figure 10:
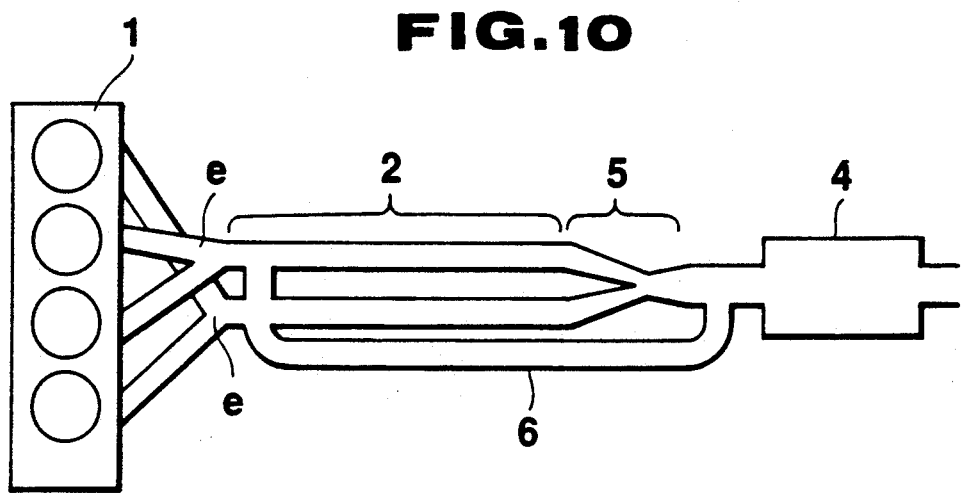
FIGS. 10 and 11 are plan views respectively illustrating two different exhaust paths of the exhaust systems of FIGS. 6A and 9A in a valve open state wherein an exhaust gas flow control valve employed in the exhaust system according to the invention is fully opened.
Figure 11:
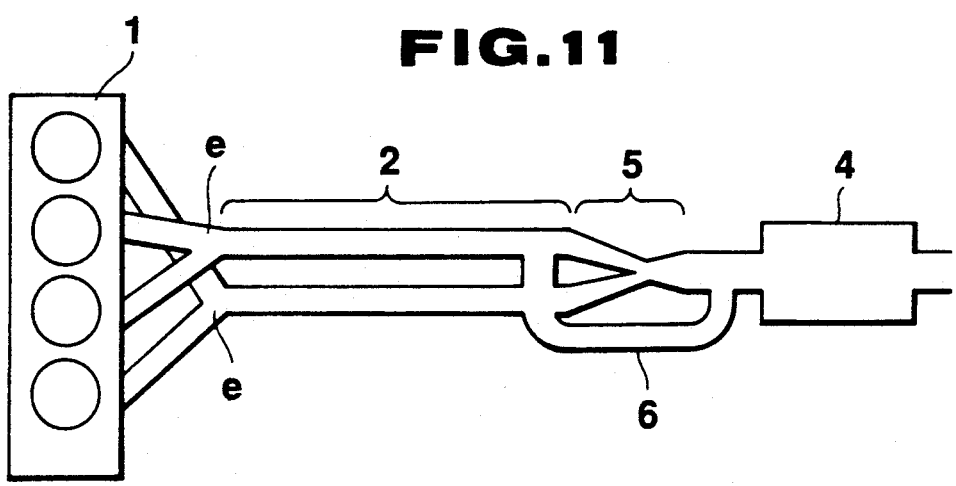
Figure 12:
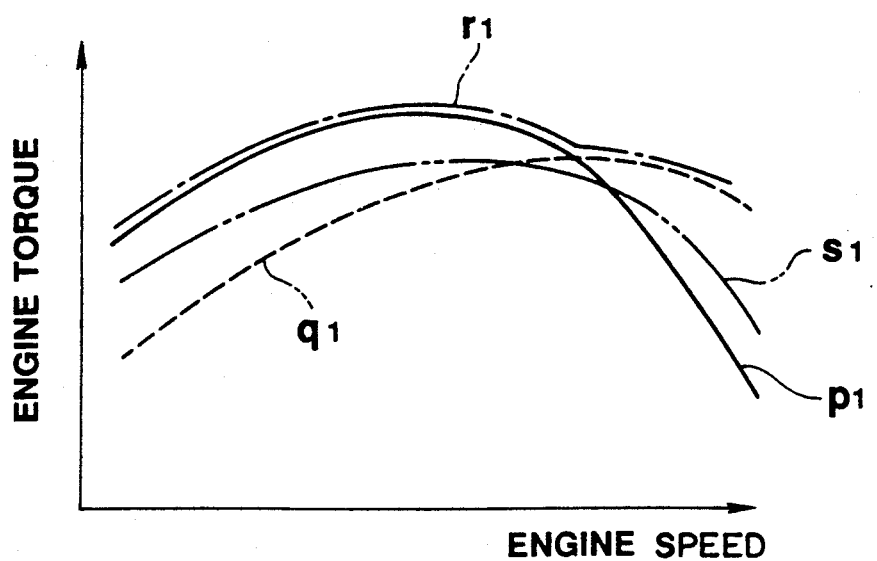
FIG. 12 is a graph illustrating engine torque characteristics of the embodiment of FIG. 6A and the modification of FIG. 9A

6A and 9A according to the invention, FIG. 10 is a schematic view illustrating an exhaust path of the embodiment of FIG. 6A in a valve fully open state, while FIG. 11 is a schematic view illustrating an exhaust path of the modification of FIG. 9A in a valve fully open state. Traditionally, a multiple-cylinder internal combustion engine, such as a four-cylinder in line engine, includes convergent portions e to which the associated branch exhaust passages (a, b, c, d) of an exhaust manifold are converged. The exhaust gas flows, pulsatingly exhausted from the associated cylinder #1, #4 or #2, #3, interfere with each other as exhaust pressure waves at the convergent portions e. Specifically, during high engine speeds, the exhaust pressure waves tend to highly interfere with each other, thereby resulting in an increase in exhaust lose. Assuming that the valve 7 is in a fully open state over all engine speeds, that is the exhaust paths are always defined as shown in FIGS. 10 and 11, the valve constantly open states of the exhaust systems of FIGS. 10 and 11 exhibit two engine torque characteristics indicated by the broken line $q_1$ and the two-dotted line $s_1$ as shown in the graph of FIG. 12. In the aforementioned valve constantly open state, the exhaust system of FIG. 11 exceeds the engine torque of FIG. 10 within a low or medium engine speed range, while the exhaust system of FIG. 10 exceeds that of FIG. 11 within a high engine speed range.

Note that exhaust loss due to the interference of exhaust pressure waves occurring at the convergent portions e during high engine speeds, is lowered depending on the distance l between the exhaust valve and the previously described connection portion of the communication passage 6 to the dual tube section 2. In other words, when the additional communication passage 6 acts in a manner so as to be combined with the two passages $2_a$ and $2_b$, the combined passages create an effect similar to a diffuser. Therefore, during high engine speeds, it is desirable that the distance l is shorter as shown in FIGS. 6A and 10, because exhaust loss is lowered due to a higher diffusion effect caused by the shorter distance l. During low or medium engine speeds, the diffusion effect of the combined passages excerts a bad influence on the scavenging efficiency of the engine, because back pressure becomes high. The exhaust system shown in FIGS. 6A and 10 corresponds to an actual distance l of approximately 400 mm.

Figure 13:
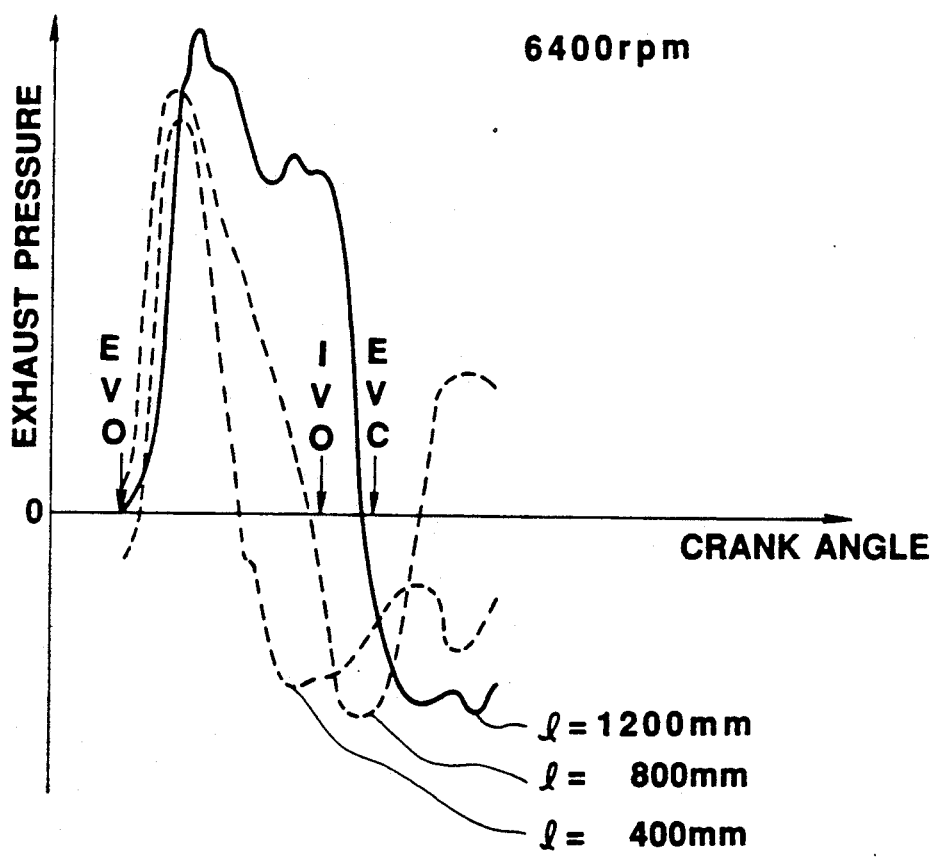
FIG. 13 is a graph illustrating exhaust pressure pulsations in the exhaust port relative to crank angle of the engine, derived from three installation positions of the exhaust gas flow control valve employed in the exhaust system according to the invention.

FIG. 13 is the graph illustrating a relationship between the exhaust pressure measured in the exhaust ports and the crank angles at a high engine speed of 6400 rpm at three different distances l, namely 400 mm, 800 mm and 1200 mm. In FIG. 13, character EVO designates an exhaust valve open angular position, character IVO designates an intake valve open angular position, and character EVC designates an exhaust valve close angular position.

As seen in the graph of FIG. 13, at a high engine speed of 6400 rpm, during valve overlap corresponding to the region between characters IVO and EVC wherein both of the intake valve and the exhaust valve are opened, it was found that there is a tendency for the exhaust pressure to effectively drop, when the distance l is within 400 mm to 800 mm. In this manner, a suitably selected distance l may provide optimal scavenging efficiency at the aforementioned high engine speed during valve overlap. Consequently, within a range of 400 mm to 800 mm, the engine torque may be effectively enhanced during high engine speeds.

Returning now to FIG. 12, the exhaust system of the invention operates such that the valve 7 is fully closed within a low or medium engine speed range and the valve 7 is fully opened within a high engine speed range. That is, within a low or medium engine speed range, the engine employing the exhaust systems of FIGS. 6A or 9A exhibits engine torque characteristics changing along the continuous line $p_1$ indicating the valve fully closed state, while within a high engine speed range, the engine employing the exhaust system of FIG. 6A exhibits engine torque characteristics changing along the broken line $q_1$. On the other hand, the engine employing the exhaust system of FIG. 9A exhibits engine torque characteristics changing along the two dotted line $s_1$. For example, the engine employing the exhaust system of FIG. 6A has an engine torque characteristics curve illustrated by the dashed line $r_1$.

As will be appreciated from the above, the exhaust system of the embodiment or the modification according to the invention can maintain high engine torque within low or medium engine speed ranges via the ejector effect and in addition can prevent engine torque from being lost at high engine speed ranges.

As previously described, since the exhaust system of the embodiment shown in FIGS. 6A and 10 has a relatively short distance l of approximately 400 mm, the connection portion upstream of the communication passage 6 and the valve 7 may be integrally assembled with the exhaust manifold of the engine. This construction decreases manufacturing costs.

Figure 14A:
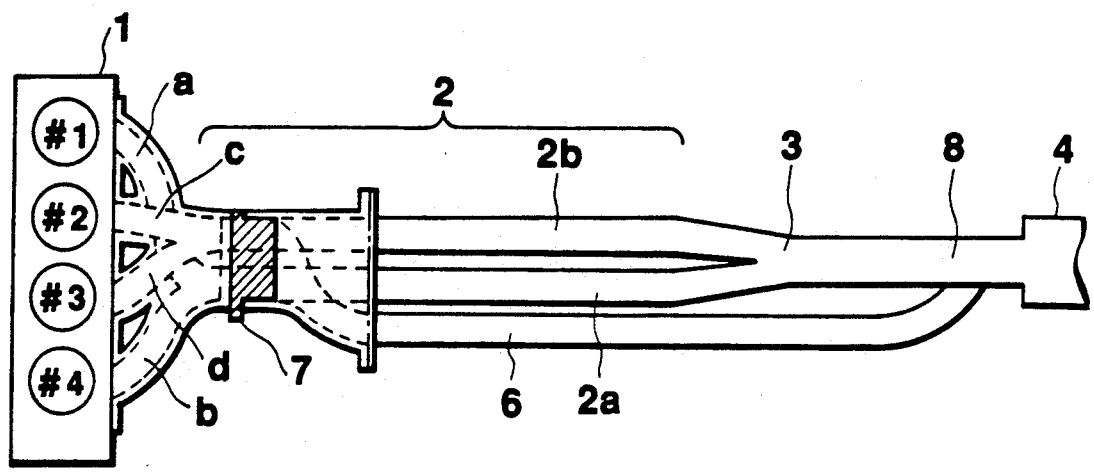
FIGS. 14A and 14B are a plan view and a front view in elevation illustrating another embodiment of an exhaust system for internal combustion engines according to the invention.
Figure 14B:
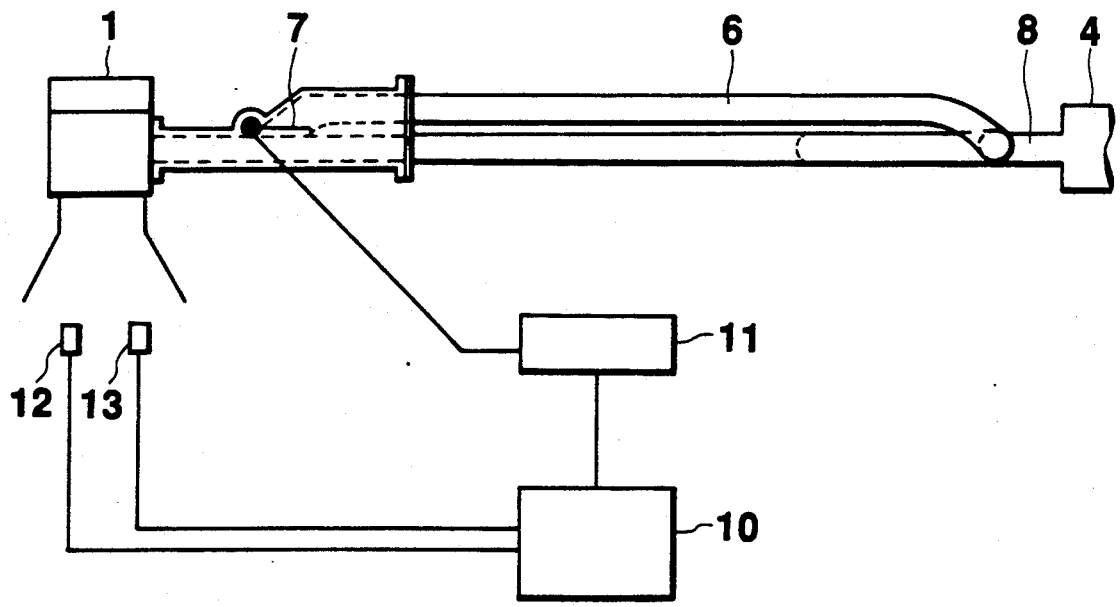

In the previously described embodiment and modification, although the exhaust systems include a pulse converter provided at the confluent point of two exhaust passages of a dual tube section, the construction according to the invention may be applied for exhaust systems without employing a pulse converter. As shown in FIGS. 14A and 14B, when the construction of the invention is applied for the exhaust system without a pulse converter, the control unit 10 also controls the actuator 11 such that when the engine is in low or medium speeds the valve 7 is fully closed, and when the engine is in high speeds the valve 7 is fully opened. In this manner, the aforementioned exhaust system without a pulse converter according to the invention can also prevent the engine torque from being lost during high engine speeds.

Although the construction of the invention is preferably applied for exhaust systems including a dual exhaust tube section as previously described, this construction may be applied for exhaust systems including a multiple exhaust tube section, for example three or more exhaust tube sections.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. An exhaust system for internal combustion engines comprising:
    at least two exhaust passages, each passage communicated with at least one branch exhaust passage of an exhaust manifold communicating exhaust ports of a multiple-cylinder engine;
    a confluent exhaust passage disposed downstream of said at least two exhaust passages, said confluent exhaust passage including a confluent point for converging downstream ends of said at least two exhaust passages; and means for bypassing a portion of exhaust gas flow through said confluent point only when the engine is within a predetermined high engine revolution range.

2. The exhaust system as set forth in claim 1, wherein said bypassing means includes a communication passage for bypassing said confluent point and intercommunicating said at least two exhaust passages and said confluent exhaust passage, a valve for establishing and blocking the bypassed exhaust gas flow through said communication passage, and valve control means for opening said valve only when the engine is within said predetermined high engine speed range.

3. The exhaust system as set forth in claim 2, wherein said valve control means includes sensor means for monitoring an operating state of the engine, a control unit for determining the operating state of the engine on the basis of at least one signal from said sensor means, and an actuator for actuating said valve in response to a control signal from said control unit.

4. An exhaust system for internal combustion engines comprising:
- a dual exhaust tube section defining two exhaust passages, each passage communicated with at least two branch exhaust passages of an exhaust manifold communicating exhaust ports of a multiple-cylinder engine;
- a confluent exhaust passage disposed downstream of said two exhaust passages, said confluent exhaust passage including a confluent point for converging downstream ends of said two exhaust passages;
- a communication passage for bypassing said confluent point and intercommunicating said two exhaust passages and said confluent exhaust passage so as to bypass a portion of exhaust gas flow through said confluent point;
- a valve disposed in said communication passage, for establishing and blocking the bypassed exhaust gas flow through said communication passage;
- sensor means for monitoring an operating state of the engine; and
- valve control means for opening said valve only when said opening means determines on the basis of at least one signal from said sensor means that the engine is within a predetermined high engine speed range.

5. The exhaust system as set forth in claim 4, wherein said sensor means includes a sensor generating a signal representative of a throttle opening angle and/or a sensor generating a signal representative of engine speed.

6. An exhaust system for internal combustion engines comprising:
- at least two exhaust passages, each passage communicated with at least one branch exhaust passage of an exhaust manifold communicating exhaust ports of a multiple-cylinder engine;
- a confluent exhaust passage disposed downstream of said at least two exhaust passages, said confluent exhaust passage including a confluent point for converging downstream ends of said at least two exhaust passages;
- a pulse converter disposed in the vicinity of said confluent point for changing flow velocity and pressure of exhaust gas, said pulse converter being comprised of an ejector disposed adjacent to and upstream of said confluent point and a diffuser disposed adjacent to and downstream of said confluent point; and
- means for varying exhaust gas flow through said pulse converter such that the exhaust gas flow is decreased only when the engine is within a predetermined high speed range.

7. The exhaust system as set forth in claim 6, wherein said varying means comprises:
- a communication passage substantially parallel with said at least two exhaust passages for intercommunicating said two exhaust passages and said confluent exhaust passage downstream of said pulse converter so as to bypass a portion of the exhaust gas flow through said pulse converter;
- a valve disposed in said communication passage, for establishing and blocking the bypassed exhaust gas flow through said communication passage;
- sensor means for monitoring an operating state of the engine; and
- valve control means for opening said valve only when said opening means determines on the basis of at least one signal from said sensor means that the engine is within the predetermined high engine speed range.

8. The exhaust system as set forth in claim 7, wherein said sensor means includes a sensor generating a signal representative of a throttle opening angle and/or a sensor generating a signal representative of an engine speed.

* * * * *

UNITED STATES PATENT AND TRADEMARK OFFICE
CERTIFICATE OF CORRECTION

PATENT NO. : 5,072,583

DATED : December 17, 1991

INVENTOR(S) : Urushihara et al.

It is certified that error appears in the above-identified patent and that said Letters Patent is hereby corrected as shown below:

Claim 1, column 9, line 6, change "revolution" to --speed--.

Signed and Sealed this

Twentieth Day of July, 1993

Attest:

MICHAEL K. KIRK

Attesting Officer

Acting Commissioner of Patents and Trademarks